March 23, 1965  J. P. WOODS  3,175,182
SEISMIC RECORD CORRECTOR
Filed Sept. 15, 1958  3 Sheets-Sheet 1

STATIC DELAYS
$S = 0.25$ sec.
$Xa = 0.00$ sec.
$Xb = 0.50$ sec.
$Xc = 1.00$ sec.
$Ta = 0.25$ sec.
$Tb = 0.75$ sec.
$Tc = 1.25$ sec.

ATTEST:
Charles F. Steininger

INVENTOR.
John P. Woods.
BY Norbert E. Birch

March 23, 1965

J. P. WOODS

3,175,182

SEISMIC RECORD CORRECTOR

Filed Sept. 15, 1958

ATTEST:

Charles F. Steininger

INVENTOR.
John P. Woods.
BY

March 23, 1965 J. P. WOODS 3,175,182
SEISMIC RECORD CORRECTOR
Filed Sept. 15, 1958 3 Sheets-Sheet 3

Fig.6

ATTEST:
Charles F. Steininger

INVENTOR.
John P. Woods.
BY Norbert E. Birch

United States Patent Office 3,175,182
Patented Mar. 23, 1965

3,175,182
SEISMIC RECORD CORRECTOR
John P. Woods, Dallas, Tex., assignor to The Atlantic Refining Company, Philadelphia, Pa., a corporation of Pennsylvania
Filed Sept. 15, 1958, Ser. No. 761,044
12 Claims. (Cl. 340—15.5)

The present invention relates to a novel method and apparatus for correcting seismic records obtained according to conventional seismic prospecting methods and producing from such corrected records cross section plots representing a two-dimensional view of subsurface strata. In a more particular aspect, the present invention relates to a method and apparatus for applying time corrections to seismic traces of a seismic record in order to produce a resultant record with such traces plotted to a corrected travel time or depth scale and cross section plots of one or more such records depicting the true attitude of various subsurface strata.

Figures 1, 2:
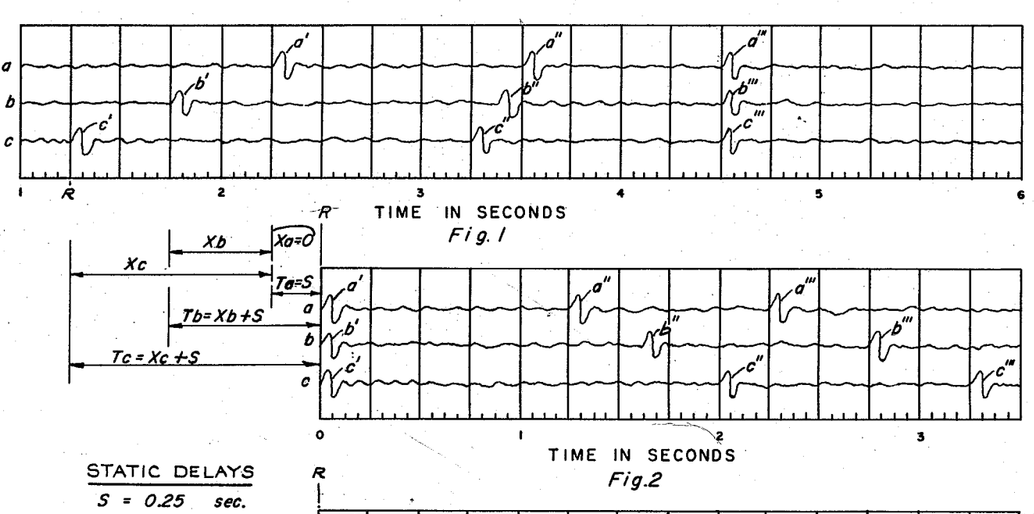
FIGURE 2 is a partially corrected record of the seismic traces shown in FIGURE 1.

In order to clearly illustrate the problems involved in correcting seismic records, reference should be made to FIGURE 1 of the accompanying drawings.

FIGURE 1 represents a portion of a seismic record obtained as a result of a conventional seismic prospecting operation.

In seismic prospecting, elastic waves are created at or adjacent to the surface of the earth by detonating an explosive charge, by dropping a heavy weight to the surface of the earth, or by other like means. These elastic waves are transmitted through the earth and at least a portion of such waves traverse downwardly through the earth and are reflected back to the earth's surface from the interfaces of subsurface strata due to discontinuities or variations in the elastic wave transmitting properties of such strata. By placing geophones or seismic pickups on or adjacent the surface of the earth at points displaced from the origin of the seismic energy, the arrival of the various waves at the surface of the earth may be detected. These geophones convert the detected waves to equivalent electrical signals which are then amplified and recorded in a form known as a seismogram or seismic record. This seismic record consists of a plurality of traces arranged in parallel relation each representative of the output of an individual geophone. A portion of such a seismic record is shown in FIGURE 1 of the drawings wherein traces $a$, $b$ and $c$ represent the outputs of corresponding geophones $a$, $b$ and $c$, respectively. It is conventional practice to record on a single seismic record the outputs from about 12 to 24 geophones spaced over distances up to approximately 3,000 feet from the source of energy. The seismic record also generally includes an additional trace including an indication of the instant at which the seismic energy was created, generally referred to as a "time-break" trace, and one or more constant frequency timing signals which may be correlated with the significant events on the seismic traces to determine travel time to such event. With this latter information, the seismic record can be examined to determine the time required for seismic energy to travel downwardly through the earth and be reflected back to the geophones. This travel time information may, in turn, be converted to depth information by combination with known or previously measured velocity information; and by correlating the traces of a single record or of a plurality of records obtained over a selected exploratory area, the attitude or dip, curvature, and the like of such subsurface strata may be determined. This general method of seismic prospecting thus permits the obtention of valuable geological information particularly useful in exploration for hydrocarbon deposits.

A long-standing difficulty in employing seismic prospecting methods is that of analyzing the seismic records. Due to the complexity of elastic waves, the many factors affecting their transmission through the earth, the multiplicity of reflecting barriers within the earth, and the necessary physical arrangement of geophones, the interpretation of these seismic records is extremely difficult. To aid in the interpretation of seismic records, it is generally necessary to correct each seismic trace to compensate for certain errors in travel time and to correct the travel time relationship of a number of individual traces so that the same significant events appearing on a plurality of related traces will be properly correlated. It is only by such correction and correlation of significant events that true travel times and the true depth and attitude of subsurface strata can be ascertained.

Referring again to FIGURE 1, traces $a$, $b$ and $c$ have been greatly simplified for illustrative purposes, and the recorded signals shown are not necessarily an accurate representation of an actual received signal. In addition, the travel time errors previously referred to have been exaggerated in order to clarify the illustration and certain simplifying assumptions have been made. It has first been assumed that geophone $c$ was located immediately adjacent the source of energy and that geophones $a$, $b$ and $c$ were equally spaced one from the other in a straight line. This type of geometrical arrangement of geophones is generally referred to as a single-ended spread. However, a number of other known arrangements are also employed in conventional seismic practice. In general, however, the geophones are arranged in straight lines passing through the source of energy or offset from the source of energy. It has also been assumed in FIGURE 1 that pulses $a'$, $b'$ and $c'$ were reflected from a horizontal reflecting barrier located at sea level. Pulses $a''$, $b''$ and $c''$ are assumed to be reflections from a horizontal reflecting barrier at an intermediate depth, and pulses $a'''$, $b'''$ and $c'''$ are assumed to be reflections received from a horizontal reflecting barrier located at great depth with respect to the other two reflecting barriers. As pointed out above, the reception of all these pulses after a specific length of time following creation of the seismic wave is subject to certain errors which result in the recorded travel times differing from the true travel time.

One travel time error which must be taken into account is that error caused by transmission of seismic energy through the so-called low velocity or weathered layer of the earth. Again, as a simplifying assumption, it has been assumed in the present case that the weathered layer extends down to sea level. Generally, this weathered layer is the upper portion of the earth extending to depths as great as 50 to 100 feet and is composed of relatively unconsolidated matter. Accordingly, seismic energy travels at a comparatively low velocity through the weathered layer. Therefore, in timing the transmission of seismic energy downwardly to a reflecting barrier and back to the surface of the earth, corrections must be applied to compensate for the additional time required for the energy to penetrate the weathered layer as compared with the time required to penetrate the higher velocity subsurface formations. This correction is commonly referred to as a "weathering" correction and can be computed by well known methods and expressed in terms of travel time. In the case illustrated by FIGURE 1, the error due to low velocity transmission through the weathered layer has been assumed to be 0.25 second. Since there is only one weathered layer, it is obvious that a single weathering correction would apply to an entire trace; that is, each incremental portion of a single seismic trace would be recorded at a time later than the true travel time by an amount equal to the weathering error. For example, each of pulses $c'$, $c''$ and $c'''$ appear on the record 0.25 second later than they would except for the error due to transmission through the weathered layer. Depending upon the character of the exploratory area, separate and different weathering corrections may desirably be applied to each geophone of a single group of geophones since the velocity of transmission or the thickness of the weathered layer may vary over the area. For purposes of illustration, however, it will be assumed that the same weathering correction may be applied to each geophone of the group illustrated and the travel time of each trace will be corrected by the same amount. Thus, traces $a$ and $b$ must also be corrected by 0.25 second, and this correction must be applied at all points along the length of each trace.

A second source of error in determining travel time from seismic records, which is particularly significant in hilly or mountainous regions, is that error caused by differences in the elevation of one geophone with respect to the other geophones. Obviously, a geophone located in a valley will detect seismic energy reflected from a given subsurface barrier earlier than another geophone located the same distance from the source of energy but at a higher elevation would detect energy reflected from the same barrier. Therefore, in order to determine the true travel time of seismic energy, it is also necessary to apply travel time corrections to compensate for these differences in travel times to the various geophones which are caused by differences in elevation. The "elevation" correction when applicable may also be calculated by known methods and applied in the same manner as the weathering correction. Also, as is the case in the weathering correction, a single compensating correction will apply throughout the length of an individual trace; that is, will be static over the entire length of each trace. It is also obvious that a different elevation correction will apply to each of the individual traces.

However, since both the weathering and elevation corrections referred to above will be static or nonvariable throughout the length of a single seismic trace, these two corrections may be algebraically combined to form a single correction. These lumped, or combined, weathering and elevation corrections are commonly referred to in the art as "static" corrections and the cumulative or static correction will be nonvariable throughout the length of the trace but will possibly differ from trace to trace in each related group of traces under consideration. In the case illustrated in FIGURE 1, no elevation correction is necessary since all geophones were located at the same elevation.

The static corrections discussed thus far obviously assume that the travel paths from the source of energy to the reflecting barriers and back to the surface of the earth are substantially vertical paths. This assumption would be true so far as trace $c$ of FIGURE 1 is concerned since geophone $c$ was located immediately adjacent the source of energy. However, so far as traces $a$ and $b$ are concerned, this assumption is at odds with the geometry or horizontal spacing of the geophones from the source of energy and a third correction known as the "normal move-out" correction is necessary to compensate for the geophone spacing before true depth information can be determined form the record. Since a geophone spaced a finite distance from the source of energy will not receive energy which follows a vertical path from the source down to the reflecting barrier and back to the surface but will instead receive energy which follows a slant-ray path from the source to the reflector and back to the geophone, and such an angular or slant-ray path is longer than a vertical path; in order to obtain the so-called "true" or vertical travel time information which may be converted directly to vertical depth information, the normal move-out correction must be applied to convert the recorded times to times which would be obtained if the travel path were in fact vertical from the geophone in question to the reflecting barrier and back to the geophone.

As stated previously, since geophone $c$ was located adjacent the source of energy, a vertical path was followed by the energy received by geophone $c$ and no normal move-out error will appear in trace $c$ at any point. Since the energy received by geophone $b$ would follow a slant-ray path, a normal move-out error appears in trace $b$. It is assumed in the present case that the time required for energy to follow the slant-ray path from the source to the sea level reflecting barrier and back to geophone $b$, as opposed to a vertical path from geophone $b$ to the sea level barrier and back to geophone $b$, is 0.5 second. A similar situation exists with respect to trace $a$ except that since geophone $a$ was further from the source than geophone $b$, the travel path will be even longer, and the normal move-out error will be greater. It is assumed in FIGURE 1 that pulse $a'$ was received one second later than it would have been if it had followed a vertical travel path.

If one were interested only in the travel time to a near-surface reflecting barrier, such as the sea level barrier in the present case, and thus were interested only in the travel times to pulses $a'$, $b'$ and $c'$, the application of the normal move-out correction would be comparatively simple, and this correction could be added to the previously discussed static correction. However, one is always interested in determining travel time and, ultimately, depth to substantially deeper reflecting barriers and is little concerned with the near-surface barriers. Accordingly, the travel time to the deeper reflectors which resulted in pulses $a''$ and $b''$ and $a'''$ and $b'''$, respectively, are of greatest interest. It is obvious that as the depth of a reflecting barrier increases the angle of the slant-ray path will decrease, and at great depth the slant-ray path approximates a vertical travel path. In fact, at the theoretical infinite depth, the path would be vertical. Therefore, at great depth or toward the end of the seismic trace, the normal move-out correction will approach zero. This is illustrated by the fact that pulses $a'''$, $b'''$ and $c'''$, obtained from a reflecting barrier at great depth, are properly aligned to indicate a horizontal barrier and these three pulses appear on the record at the desired or true travel time except for the previously discussed weathering error. Accordingly, no significant normal move-out correction will be necessary at this point on the traces. However, reflections obtained from barriers intermediate the near-surface barrier and the barrier at great depth will be in error by amounts smaller than that applicable to reflections from the near-surface barrier but greater than zero. Thus, it may be seen that the normal move-out correction varies from a maximum to a minimum or zero from the beginning of the trace to the end of the trace and that a different similarly variable correction applies to each trace recorded by a geophone located a different finite distance from the source of energy than the geophone recording the first-mentioned trace. This normal move-out error, or the normal move-out correction, is logically referred to in the art as a "dynamic" correction since it varies from a maximum to a minimum throughout the length of a trace. Accordingly, in applying the normal move-out correction a different travel time correction must be applied to each seismic trace of a related group of traces to compensate for the different spread or spacing of each geophone from the source of energy, and these corrections must be gradually decreased throughout the length of the traces. This correction can also be calculated from known relationships by employing predetermined velocity and spread information and can be expressed in terms of travel time by an orthogonal coordinate plot in which one coordinate represents the error or correction in units of time and the other coordinate represents units of time along the record or along the length of the trace.

It has heretofore been the practice in the field of seismic prospecting to visually inspect seismic records to observe possible reflecting barriers, compute the enumerated travel time corrections, apply these corrections to each trace or a group of traces, as appropriate, and finally to piece together a plurality of seismic records and plot a two-dimensional cross section of subsurface strata either in terms of two-way, vertical travel time or depth. Such interpretation, correction and plotting is obviously dependent upon the experience of the interpreter, including his ability to recognize disassociated significant events from a complex set of individual traces and the accuracy of the interpreter's application of the enumerated corrections. Efforts have been made in the past to simplify such interpretation by devising mechanical drafting apparatuses with which the necessary corrections can be mechanically applied and cross section plots of a plurality of traces can be drawn. However, such mechanical aids do not eliminate the major portion of the personal element involved and their use is time consuming.

More recently, apparatuses for automatically applying corrections to seismic traces and plotting cross section maps of corrected traces in their proper relation have been developed. These apparatuses in a broad sense emulate certain operations of data computers. As is obvious to anyone familiar with the analog-type computers, such devices are generally seriously limited in their scope of operation. For example, the accuracy of any such device is inherently limited. In addition, there is generally a limitation on the total value of the time correction which can be applied and a lower limit to the magnitude of the corrections which can be applied. Such analog devices also require extremely stable and rather complicated means for supplying appropriate commands of the magnitude of the corrections and the times at which corrections shall be applied. Because of the greater accuracy involved, it would appear that the digital approach to the problem of automatically correcting seismic records would be most desirable. However, it is well known that any digital-type device is extremely complex and delicate; and, because of these limitations, requires a substantial amount of "down time" for repair and adjustment.

It is, therefore, an object of the present invention to proved a novel method and apparatus for time correcting seismic records which is simple and accurate.

Another object of the present invention is to provide a novel method and apparatus for time correcting seismic records by the use of a magnetic delay line.

Another and further object of the present invention is to provide a novel method and apparatus for time correcting seismic records in which the total value of corrections which can be applied to a single seismic trace is limited only by the number of component units of magnetic delay line which the operator desires to employ.

Still another object of the present invention is to provide a novel method and apparatus for time correcting seismic records in which the number of individual corrections which can be applied to a single seismic trace is limited only by the physical arrangement of recording and receiving transducers, the physical size of recording and receiving transducers and/or the number of component units of a magnetic delay line which the operator desires to employ.

Similarly, it is a further object of the present invention to provide a novel method and apparatus for time correcting seismic records in which the smallest value of individual corrections which can be applied is limited only by the physical arrangement of recording and receiving transducers, the physical size of recording and receiving transducers and/or the number of component units of a magnetic delay line which the operator desires to employ.

A still further object of the present invention is to provide a novel method and apparatus for time correcting seismic records which is essentially independent of the nature of the command source employed to dictate the magnitude and point of application of each individual correction.

Other objects and advantages of the present invention will be apparent from the following description of applicant's invention when read in conjunction with the previous description of FIGURE 1 and the remaining figures of the drawings, wherein.

In accordance with the present invention, a method and apparatus for applying dynamic correction to a seismic signal having a function of time as its independent variable comprising supplying a single series of commands representative of equal time delays and spaced at predetermined points in time along a time scale proportional to the scale of the independent variable indicating points where said time delays are to be applied, continuously accumulating said commands at each of said points in time, and sequentially delaying the positions of successive portions of said signal at a plurality of points along said scale of said independent variable corresponding to each of said points in time along said time scale by equal distances such that the total dynamic delay applied to said signal at any moment is proportional to the accumulated commands at said corresponding point in time.

*Derivation and nature of commands*

The derivation and nature of the commands necessary to the practice of applicant's method and the operations of applicant's apparatus will best be described by reference to FIGURES 1 through 5, inclusive.

As was pointed out previously, a number of assumptions have been made in the construction of FIGURE 1, and errors have been exaggerated in order to facilitate the description and provide clear graphical representations. Accordingly, FIGURES 2 through 5, since they are based on the record of FIGURE 1, are also somewhat distorted and greatly simplified as compared with situations met in actual practice.

It is to be recalled in connection with the discussion of FIGURE 1, that it was assumed that detector $c$ was located immediately adjacent the source of energy; that the elevation of detectors $a$, $b$ and $c$ was the same; that both near-surface and subsurface velocities were constant throughout the area covered by detectors $a$, $b$ and $c$; that detectors $a$, $b$ and $c$ were equally spaced one from the other; that pulses $a'$, $b'$ and $c'$ were received from a reflecting barrier at sea level and the weathered layer extended from the surface to this barrier; and finally that pulses $a'''$, $b'''$ and $c'''$ were received from a horizontal reflecting barrier at great depth relative to the surface of the earth, the sea level reflecting barrier and the horizontal reflecting barrier reflecting pulses $a''$, $b''$ and $c''$.

It was also previously pointed out that all pulses of traces $a$, $b$ and $c$ arrived later than they normally should because of the low velocity of travel through the weathered layer. The actual recorded travel time of all these events was, therefore, assumed to be in error by 0.25 second due to the weathering error. Therefore, pulse $c$, received by the detector adjacent the source of energy, arrived 0.25 second late. However, since detector $b$ was located a finite distance from the source of energy, pulse $b'$ was received still later as a result of energy following a slant-ray path from the source to the reflecting barrier and back to geophone $b$. Accordingly, pulse $b'$ arrived late by the weathering error 0.25 second plus the normal move-out error, assumed to be 0.5 second. Similarly, since detector *a* was located twice as far from the source of energy as detector *b*, pulse *a'* arrived late by a time equal to the weathering error 0.25 second plus the normal move-out error assumed to be 1.0 second. By applying the additional normal move-out corrections to pulse *a* and *b*, the corrected time will then represent the two-way travel time which would result if the energy followed a vertical path from the geophone in question to the sea level reflecting barrier and back to the geophone. The following errors are, therefore, present in the traces designated.

| Trace | Weathering Error | Normal Move-Out Error | Total Error |
|---|---|---|---|
| c | 0.25 | 0.00 | 0.25 |
| b | 0.25 | 0.50 | 0.75 |
| a | 0.25 | 1.00 | 1.25 |

Thus, if we are interested only in properly aligning pulses *c'*, *b'* and *a'* and determining the two-way vertical travel time to the sea level reflecting barrier, the obvious means of correcting the record would be to advance pulses *c'*, *b'* and *a'* by amounts equal to the applicable total error. This could be carried out by means of an appropriate magnetic drum recording system designed to re-record each signal earlier in time than its actual time; but, from a practical standpoint, it is much simpler to apply the corrections by means of delays. In order to do this, the corrections must be applied in their reverse order, i.e., the delay applicable to the signal detected by the geophone furthest from the source of energy must be applied to the signal detected by the geophone nearest the source of energy and vice versa. The errors previously mentioned are expressed in terms of delays in the column opposite FIGURE 3 and by the distances shown in FIGURE 2. After applying the designated delays to traces *a*, *b*, *c* FIGURE 2 thus shows pulses *a'*, *b'* and *c'* properly correlated to depict a horizontal reflecting barrier at sea level. If one were interested in the two-way travel time to the sea level reflecting barrier, the two-way, vertical travel time to the sea level reflecting barrier as represented by pulses *a'*, *b'* and *c'* would be one second (see FIGURE 1 and previous discussion). However, normally one is not interested in such a shallow reflecting barrier; and, therefore, for purposes of the final corrected record, sea level or some other appropriate horizontal plane is selected as a reference plane and two-way travel time from that reference plane to deeper reflecting barriers is computed. Accordingly, in the present case, sea level is selected as the reference plane and this reference plane is designated as zero time on FIGURES 2 and 3.

We will now turn our attention to the deeper reflecting barriers depicted by the later arriving pulses of FIGURE 1. Since geophone *c* was located immediately adjacent the source of energy, all reflected energy detected by geophone *c* followed vertical travel paths; and all pulses, including pulses *c''* and *c'''*, will be shown on FIGURE 2 at their proper points in time representing vertical two-way travel time. However, we have not as yet taken into consideration the fact that the normal move-out correction applicable to traces *a* and *b* varied throughout the length of the trace; and it was incorrect to apply the maximum normal move-out correction, which is applicable only to the near-surface reflections *a'* and *b'* to the later reflections *a''* and *b''* and *a'''* and *b'''*. Thus, in FIGURE 2, the latter groups of pulses are not properly aligned with corresponding pulses *c''* and *c'''* and do not appear on the record at times indicative of vertical two-way travel time as desired.

As previously mentioned, the variable or dynamic normal move-out correction can be represented in terms of a coordinate plot having the normal move-out error, expressed in seconds, representing one coordinate and time in seconds along the original, uncorrected record as the other coordinate. If desired, the time scale of this plot could be the corrected time scale of FIGURES 2 and 3. The derivation and plotting of such a normal move-out curve is well known to those skilled in the art. However, since we are correcting a seismic record by means of delays as opposed to advancing incremental portions of a seismic trace at appropriate times, the conventional normal move-out curves should be reversed and expressed as shown in FIGURE 4. The plot of FIGURE 4 will, therefore, show delay in seconds as the ordinate and time in seconds as the abscissa. The distances depicted to the left of FIGURE 4 correspond to the previously applied static delays. Referring again to FIGURE 2, it may be seen that pulses *a''* and *a'''* and *b''* and *b'''* appear on the record earlier than they normally should. Accordingly, in order to properly align these pulses with corresponding pulses *c''* and *c'''* and present the former pulses at times on the record indicative of vertical two-way travel time relative to the reference plane at sea level, we must apply additional delays to traces *a* and *b* in amounts and at times dictated by the normal move-out curves of FIGURE 4. We will now assume that the dynamic delays or normal move-out delays are to be applied in increments of 0.0625 second. It will be seen that 1.25 second of static delay was already introduced in the replotting of trace *c* and the normal move-out curve shows no additional delay is necessary ($Yc=0$). However, trace *b* had only 0.75 second of static delay applied, and therefore an additional delay totaling 0.5 second must be applied in increments of 0.0625 second. Thus, each time 0.0625 second delay above 0.75 second is necessary to approximate the curve for trace *b* (distance $Yb$ representing the cumulative additional delays), such additional delay will be introduced and these delays will be applied at points in time along the trace indicated by the vertical lines intersecting the curve at the appropriate points on the curve. Eight delays, in increments of 0.0625 second, will, therefore, be applied to trace *b*. Similarly, trace *a* has had applied thereto a static delay of 0.25 second, and it is necessary to apply a total additional delay of 1.00 second to the trace. Therefore sixteen delays of 0.0625 second are applied along the length of trace at the times indicated by the vertical lines intersecting the curve for trace *a*.

Figure 3:
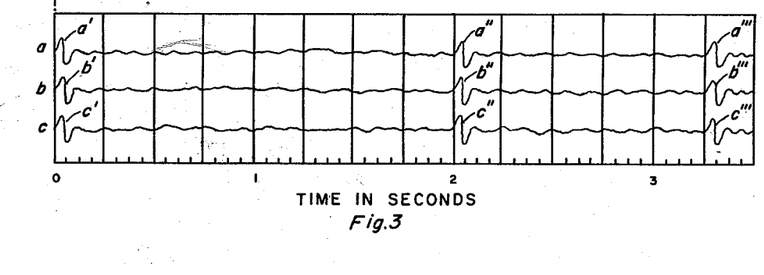
FIGURE 3 is a completely corrected record similar to that of FIGURE 2.
Figure 4:
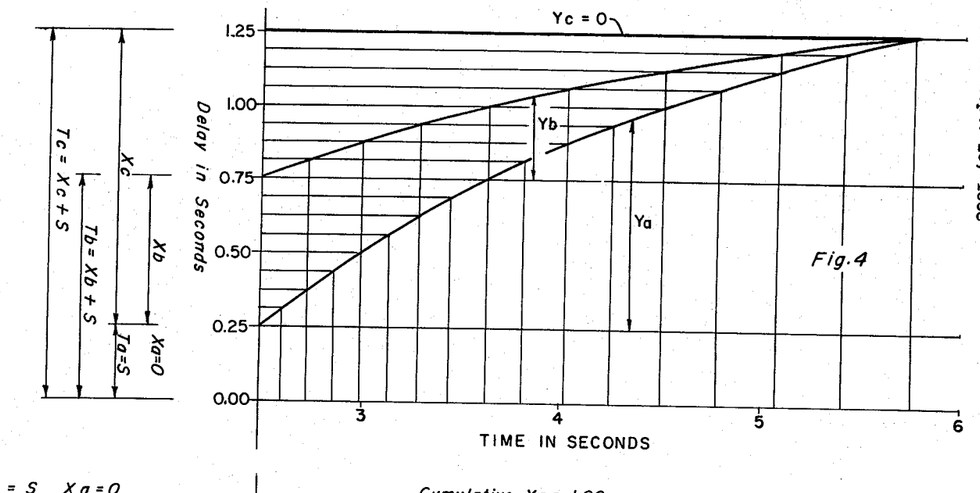
FIGURE 4 is a coordinate plot of normal move-out corrections applicable to the record of FIGURE 1, expressed in terms of time in seconds along the length of said record.

If these additional dynamic delays are applied as previously described, the corrected traces will then appear on the final record as shown in FIGURE 3. Thus, in FIGURE 3, pulses *a'*, *b'* and *c'* are properly aligned to depict a horizontal reflecting barrier at sea level (or the reference plane) and at zero two-way, vertical travel time. Pulses *a''*, *b''* and *c''* are properly aligned to indicate a horizontal reflecting barrier located at a depth equivalent to 2 seconds of two-way, vertical travel time below the sea level reference. Finally, pulses *a'''*, *b'''* and *c'''* are properly aligned to show a horizontal reflecting barrier at great depth, which depth is equivalent to a two-way, vertical travel time of 3.25 seconds below the sea level reference.

Figure 5:
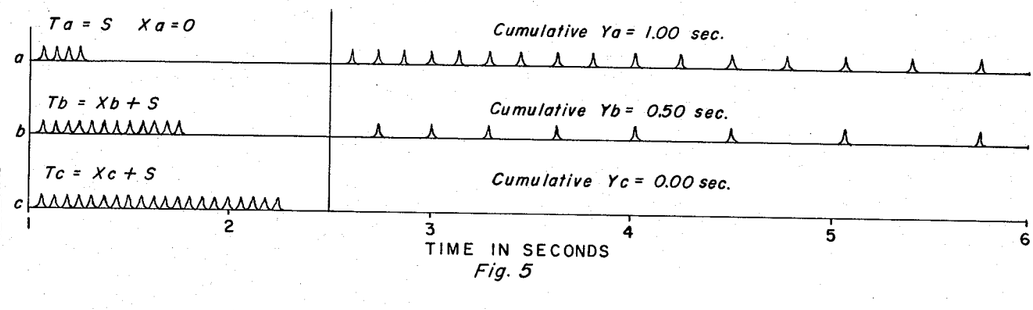
FIGURE 5 is a visual representation of the relationship and nature of commands to be employed in the time correction of the record of FIGURE 1.

Either or both of the static and dynamic delays referred to can be commanded by a series of time-spaced pulses as shown in FIGURE 5. Since the delays are to be introduced as a plurality of delays of equal magnitude, it is substantially immaterial what the nature of the commands shall be. Any device capable of creating time-spaced pulses can be employed and such pulses need not be of equal magnitude, the only requirement being that they occur at the proper points in time. Any conventional source of time-spaced electrical pulses can, therefore, be employed; and, as a matter of fact, if one were to play back or detect the seismic signals at a sufficiently slow rate, a simple pulsing key operated by hand could be employed.

As shown in FIGURE 5, the static delays are introduced as a plurality of closely spaced commands or pulses at the beginning of the record. However, these pulses representing static delays do not necessarily have to be equally spaced or spaced any finite time apart so long as all are applied prior to the time the reference time is reached or, simply, prior to the time at which the dynamic commands begin arriving. Thereafter, the dynamic commands are received and applied at the times dictated by the normal move-out curve for the trace being corrected. Since we have selected delay increments of 0.0625 second, each pulse in FIGURE 5 represents a delay of this amount. Accordingly, four pulses totaling a static delay of 0.25 second are received at the beginning of trace $a$ and, thereafter, 16 additional, time-spaced pulses are received to introduce the dynamic correction (cumulative total of 1.00 second delay). In like manner, 12 pulses representing a total static delay of 0.75 second are received at the beginning of trace $b$ and, thereafter, 8 pulses representing a cumulative dynamic delay of 0.5 second are received. With respect to trace $c$, 20 pulses representing a total static delay of 1.25 seconds are received at the beginning of trace $c$; but, since trace $c$ requires no dynamic delay, no additional pulses representing dynamic delay are received.

As mentioned at several points previously, the errors illustrated in FIGURES 1 through 5 are exaggerated. In actual practice, the total weathering and elevation corrections would vary between approximately 0.02 and 0.06 second, and the total dynamic or normal move-out correction would be approximately 0.1 to 0.5 second. In addition, the incremental delays of 0.0625 second, depicted in FIGURES 4 and 5 are much larger than those which it is desirable to apply; and, in actual practice, incremental delays of 0.001 to 0.0005 second can be conveniently applied.

*Apparatus*

Figure 6:
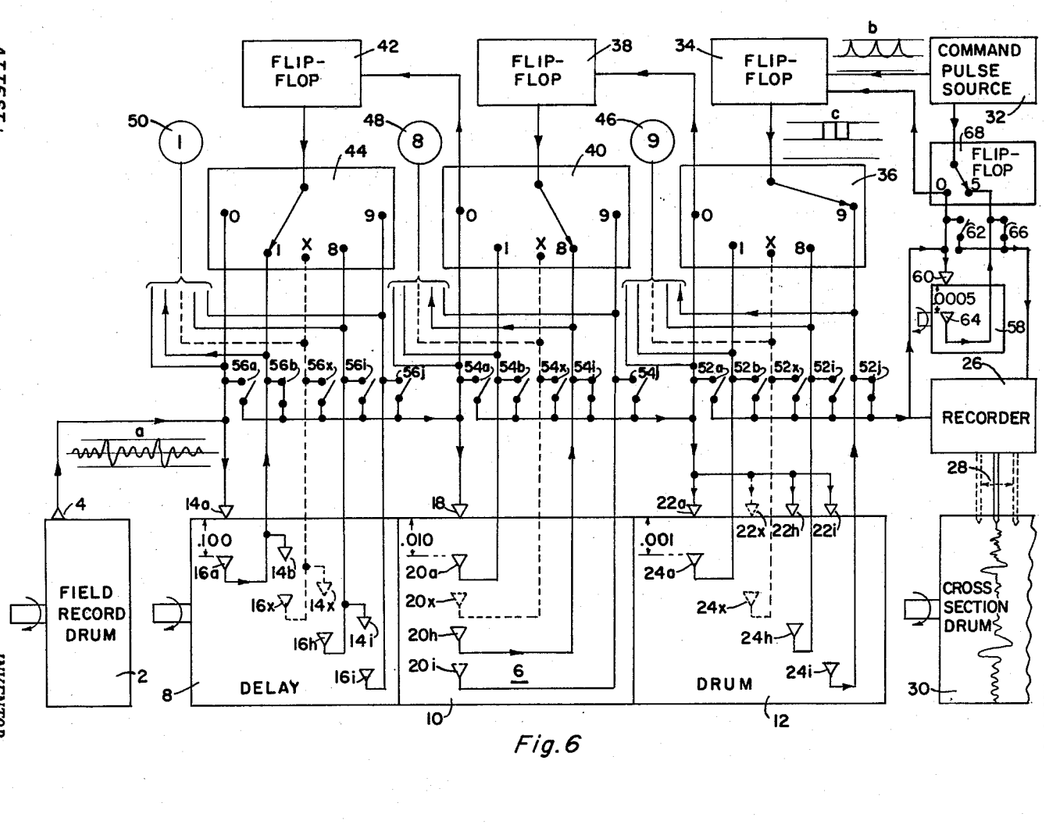
FIGURE 6 is a simplified block diagram of the apparatus employed in accordance with the present invention.

Referring specifically to FIGURE 6 of the drawings, a seismic field record consisting of a plurality of seismic signals magnetically recorded on a magnetic sheet is mounted on rotatable field record drum 2. These signals are detected and converted to equivalent electrical signals by magnetic pickup head 4 which rides on the surface of the field record and is adapted to successively detect each of the plurality of seismic signals. The electrical signal produced by magnetic pickup 4 is represented by waveform $a$. The electrical signals of waveform $a$ are then transferred to delay drum 6, which also carries a sheet of magnetic recording paper or is simply coated with a ferromagnetic material, and for convenience is shown separated into sections 8, 10 and 12, respectively. The electrical signal of waveform $a$ is either recorded on section 8 of drum 6 by recording head 14$a$ and bypassed or recorded by 14$a$ and one or more of magnetic recording heads 14$b$ through 14$i$, respectively. If the signal of waveform $a$ is not bypassed, the appropriate recorded signal on section 8 of drum 6 is then picked up by one of magnetic pickups 16$a$ through 16$i$, respectively, and is again converted to an equivalent electrical signal. This bypassed or detected electrical signal is either bypassed and recorded or recorded only on section 10 of drum 6 by magnetic recording head 18. If the electrical signal recorded on section 10 is not bypassed in addition to recording, the recorded signal on section 10 of drum 6 are detected by an appropriate one of magnetic pickup heads 20$a$ through 20$i$, respectively. The resulting bypassed or detected electrical signal is then bypassed and recorded or recorded only on section 12 of drum 6 by means of each of magnetic recording heads 22$a$ through 21$i$, respectively. If the signal recorded on section 12 is not bypassed in addition to being recorded, the recorded signal on section 12 of drum 6 is detected by an appropriate one of magnetic pickup heads 24$a$ through 24$i$, respectively. The electrical signal bypassed or detected by magnetic pickup 24 is fed to recorder 26 or to delay drum 58 as explained later. Recorder 26 is shown as a pen-type recorder having a stylus 28 which vibrates in response to the amplitude of the signal fed to recorder 26 and produces a visible trace of the signal on rotating cross section drum 30.

Magnetic recording heads 14, 18 and 22, and magnetic pickup heads 16, 20 and 24 are in fixed positions about the periphery of drum 6. The spacings between recording heads 14 and pickup heads 16 are such that, for a selected speed of rotation of drum 6, a delay of 0.100 second will be introduced between the recording of a signal by one of recording heads 14 and the detection of this signal by a complementary one of pickup heads 16; and each succeeding pickup after 16$a$ receives its signal after some delay which is a whole multiple of 0.100 second. For example, the signal will be delayed by 0.100 second when picked up by head 16$a$, by 0.200 second when picked up by head 16$b$, by 0.300 when picked up by head 16$c$, etc. Similarly, the fixed distance between recording head 18 and pickup heads 20 is such that pickup 20$a$ receives its signal after a delay of 0.010 second and each successive pickup head receives its signal after a delay which is a whole multiple of 0.010 second. Finally, the spacing between recording heads 22 and pickup heads 24 is such that whole multiples of a delay of 0.001 second will expire before each successive pickup head receives its signal. Thus, it is to be observed that the signal picked up from the field record by magnetic pickup 4 may be delayed a total of 0.999 second before its transfer to recorder 26. Obviously, by adding a fourth section to drum 6 and spacing recording heads and pickup heads in a manner such as to introduce delays in multiples of 0.0001 second, delays may be introduced in much smaller increments and the signal may be delayed a total of 0.9999 second before transmission to the recorder. Another obvious modification would be the addition of a single pair of transducers spaced so as to introduce a 1.00 second delay thus increasing the total delay range. It should also be noted at this point that various known arrangements common to magnetic delay lines may be employed to introduce preselected time delays. Three particular arrangements are shown in the drawings which are designed to employ a single delay drum for the introduction of each decimal fraction of delay. However, any of these three arrangements could be used to the exclusion of the other two. For example, an arrangement of one recording head and a plurality of pickups such as that shown on section 10 of drum 6 could be employed on three separate drums for the introduction of each decimal fraction of delay, all groups of heads could be spaced equal distances apart and each successive drum could be rotated at ten times the speed of the preceding drum. It will also be obvious to one skilled in the art that the necessity of staggering the heads, as shown on sections 8 and 12 of the drum, depends upon the delay increments desired, the speed of rotation of the delay drums and the physical size of the heads.

As previously discussed in more detail in connection with the derivation and nature of the commands, a plurality of time-spaced pulses of waveform $b$ are supplied by command pulse source 32. Each of these pulses represents a pre-selected incremental delay (0.001 second in the apparatus shown) and the pulses are spaced in time at preselected points which are coordinated with preselected points in time on the field record. The pulses of waveform $b$ are then fed to flip-flop 34 and are therein converted to a plurality of positive square wave pulses, such as those shown by waveform $c$. The pulses produced by flip-flop 34 are employed to operate sequencing switch 36. Sequencing switch 36 is shown as a simple multicontact sequencing switch, but in actual practice is an automatic electronic sequencing switch, such as, beam switching tube "Model BD–300" manufactured by the Burroughs Corporation. This switch conforms to and may be referred to as a "scaling circuit" and specifically as a "decade scaler" as defined in the International Dictionary of Physics and Electronics, D. Van Nostrand, 1956. Each time a pulse reaches sequencing switch 36, sequencing switch 36 will switch one position from positions 0 through 9, inclusive. Each time sequencing switch 36 passes through contacts 1 through 9 and returns to 0, a pulse from the 0 contact is fed to flip-flop 38. The means for sending a pulse from the zero contact each time sequencing switch 36 reaches its zero contact may be termed a "tens transfer" means as defined in the International Dictionary of Physics and Electronics, supra. Pulses from flip-flop 38 are, in turn, fed to sequencing switch 40 which is the same as sequencing switch 36. Each time sequencing switch 40 passes through contacts 1 through 9 and returns to 0, a pulse will be fed to flip-flop 42 from the 0 contact. Pulses from flip-flop 42 are then fed to sequencing switch 44, and each of such pulses will cause sequencing switch 44 to advance one contact.

Depending upon the contact of sequencing switch 36, which is live at a particular instant, a signal will be fed to counting tube 46 which visually displays the number of the contact on sequencing switch 36. Counting tube 46 may be any of a group of indicator or numerical read-out tubes manufactured by the Burroughs Corporation under the trade name "Nixie" or equivalent elements. Similarly, counting tubes 48 and 50 visually display the contact point on sequencing switches 40 and 44, respectively, which are live at a given moment.

Also depending upon which of the contacts of sequencing switch 36 is live, a signal is fed to one of switches 52a through 52j, respectively, and the appropriate switch is closed. Although switches 52 are shown as simple, mechanical switches, these switches are automatic in operation, such as conventional diode switches wherein current will flow through the diode when the plate is made positive with respect to the cathode. In like manner, switches 54a through 54j are operated by signals from sequencing switch 40 and switches 56a through 56j are actuated by signals from sequencing switch 44. The live contact position on sequencing switch 36 also determines which, if any, of magnetic pickups 24 mounted adjacent section 12 of drum 6 is actuated. Sequencing switch 40 either ectuates none or the appropriate one of pickup heads 20; and sequencing switch 44 either actuates none or an appropriate pair of recording heads 14 and pickup heads 16, for example, 16a and 14b, 16b and 14c, etc.

In accordance with the example shown in FIGURE 6, command pulse source 32 is assumed to have fed to the system 189 pulses of waveform b spaced at preselected points in time along the length of the field record and representing a total of 0.189 second of delay. In this example, sequencing switch 36 will make 189 contacts passing through the 0 contact eighteen times and then coming to rest at contact 9. Since sequencing switch 36 passed through its 0 contact eighteen times, eighteen pulses will pass to flip-flop 38 and thence to sequencing switch 40. Sequencing switch 40 will in turn make eighteen contacts passing through its 0 contact once and coming to rest at contact 8. At the time the 0 contact of sequencing switch 40 was actuated, one pulse was passed to flip-flop 42 and thence to sequencing switch 44, which moved one contact position and came to rest at contact 1. These final positions of sequencing switches 36, 40 and 44 will be visually displayed on indicator tubes 46, 48 and 50, respectively. Pickup head 4 detects a seismic signal from the field record, transfers this signal to recording head 14a. Since contact 1 on sequencing switch 44 is actuated, pickup head 16a and recording head 14b are also actuated. The signal from pickup 16a is passed through switch 56b which also has been closed by a signal from contact 1 of sequencing switch 44 and in such closed condition will pass the signal from pickup 16a to recording head 18. With contact 8 of sequencing switch 40 actuated, pickup head 20h will be actuated to detect the recorded signal and pass it through switch 54i which was closed by contact 8 of sequencing switch 40. The signal passing through switch 54i is then fed to recording heads 22a through 22i. Having contact 9 of sequencing switch 36 actuated, pickup head 24i and switch 52j will also be actuated and the signal recorded by recording head 22i on section 12 of drum 6 will be detected and passed to recorder 26. Thus, it will be seen that during the process of transfer from the field record to the cross section record, the signal detected by pickup head 4 will be delayed a total of 0.189 second, by a series of 189 increments of 0.001 second each spaced at points in time along the time scale of the signal predetermined by the point in time of each pulse from source 32.

It is also clear that one may introduce increments of delay which are a fraction of a unit of the lowest power of the scale of tens. For example, a unit for introducing delays in increments of 0.0005 second (one-half millisecond) is shown in FIGURE 6. Referring specifically to the unit of FIGURE 6, a signal after passing through the magnetic delay component designed to introduce delays of 0.001 second instead of going directly to recorder 26 is recorded on magnetic delay drum 58 by means of recording transducer 60. In addition to recordation by transducer 60, this signal is either bypassed through switch 62 and then fed to recorder 26 or the signal recorded by transducer 60 on drum 58 is detected by receiving transducer 64, passed through switch 66 and fed to recorder 26. Since, in this case, the smallest increment of delay desired is 0.0005 second, recording transducer 60 and receiving transducer 64 are spaced apart a distance such that for a given speed of rotation of drum 58 the signal recorded by recording transducer 60 will be picked up by receiving transducer 64 0.0005 second later than it was recorded. Also, since incremental delays of 0.0005 second are desired, command pulse source 32 would supply a pulse each time a delay of 0.0005 second is desired. Such pulses would be fed to flip-flop 68. In this instance, flip-flop 68 would act as a double-pole, signal-throw switch having a zero contact and a half millisecond contact or a "binary scaler" as defined in the International Dictionary of Physics and Electronics, supra. Starting with flip-flop 68 on the zero contact, each time a pulse is received from command pulse source 32, flip-flop 68 will alternate between the zero and half millisecond contacts thus switching from the zero contact to the half millisecond contact and then back to the zero contact. Each time flip-flop 68 returns to zero contact, a pulse will pass to flip-flop 34 which actuates sequencing switch 36. As previously discussed in connection with the description of the other switching and delay components of the mechanism, when the zero contact of flip-flop 68 is actuated, switch 62 will close and the seismic signal will bypass the half millisecond delay mechanism and pass directly to recorder 26; but when the half millisecond contact of flip-flop 68 is actuated, receiving transducer 64 will be actuated and will detect the signal recorded by recording transducer 60, switch 66 will be closed and the received signal will pass through switch 66 to recorder 26.

It will also be obvious to one skilled in the art that the static delays, which are the same at each point in time along the original time scale of the signal, may be accumulated prior to detection of the signal by receiving transducer 4 and applied as a lumped delay as soon as signal detection begins rather than as a sequence of individual delays at the beginning of the signal as illustrated in FIGURE 5 of the drawings. In other words, the total fixed correction can be preset into the mechanism of FIGURE 6 and applied as a total of the individual unit delays when playback of the signal is begun.

Other modifications and variations of the present method and apparatus will be obvious to one skilled in the art and may be made without departing from the present invention so long as time changes are applied as a plurality of individual increments equal to a unit of a power of the scale of tens is carried out at some point in the operation, particularly in the application of dynamic corrections or those corrections which differ at different points in time along the original time scale of the signal. Accordingly, it is to be understood that the methods and apparatuses specifically described and shown in this specification are given by way of example and that the present invention is not to be limited to such examples but is only to be limited in accordance with the appended claims.

I claim:

1. An improved method for applying dynamic correction to a seismic signal having a function of time as its independent variable comprising
   (a) supplying a single series of commands representative of equal time delays and spaced at predetermined points in time along a time scale proportional to the scale of the independent variable indicating points where said time delays are to be applied,
   (b) continuously accumulating said commands at each of said points in time, and
   (c) sequentially delaying the positons of successive portions of said signal at a plurality of points along said scale of said independent variable corresponding to each of said points in time along said time scale by equal distances such that the total dynamic delay applied to said signal at any moment is proportional to the accumulated commands at said corresponding point in time.

2. An improved method for applying static and dynamic corrections to a seismic signal having a function of time as its independent variable comprising
   (a) delaying the initial portion of said signal by an amount equal to the total static correction; and, thereafter, supplying a single series of commands representative of equal time delays and spaced at predetermined points in time along a time scale proportional to the scale of said independent variable,
   (b) continuously accumulating said commands at each of said points in time, and
   (c) sequentially delaying the positions of successive portions of said signal at a plurality of points along said scale of said independent variable corresponding to each of said points in time along said time scale by equal distances such that the total dynamic delay applied to said signal at any moment is proportional to the accumulated commands at said corresponding point in time.

3. An improved method for applying static and dynamic corrections to a seismic signal having a function of time as its independent variable comprising
   (a) supplying a single series of first commands representative of equal time delays whose total is proportional to the total of said static correction and which are closely spaced in time along a time scale proportional to a small, initial portion of the scale of said independent variable,
   (b) continuously accumulating said commands at each of said points in time, and
   (c) sequentially delaying the positions of successive increments of said signal at a plurality of points along said initial portion of said scale of said independent variable corresponding to each of said points in time along said time scale by distances such that the total static delay applied to said signal at any point in time is proportional to the accumulated commands at said corresponding point in time; and, thereafter,
   (d) supplying a single series of second commands representative of equal time delays and spaced at predetermined points in time along a time scale proportional to the remaining portion of said scale of said independent variable,
   (e) continuously accumulating said second commands at each of said points in time, and
   (f) sequentially delaying the positions of successive portions of said signal at a plurality of points along said remaining portion of said scale of said independent variable corresponding to each of said points in time along said time scale by equal distances such that the total dynamic delay applied to said signal at any moment is proportional to the accumulated second commands at said corresponding point in time.

4. Apparatus for time delaying predetermined, incremental portions of a seismic signal; comprising,
   (a) a source of time-spaced commands;
   (b) a plurality of series connected delay line means, a first of which has a plurality of fixed contacts spaced one from the other by a distance equivalent to an increment of time which is a unit of the lowest power of the scale of tens which it is desired to delay said signal, the last of which has its contacts spaced apart by a distance equivalent to an increment of time which is a unit of the highest power of the scale of tens which it is desired to delay said signal and the intermediate of which have their contacts spaced apart by distances equivalent to increments of time which are a unit of intermediate powers of the scale of tens;
   (c) a plurality of multicontact, sequential switch means equal in number to the number of said delay line means and operative by said commands, said contacts being equal in number and electrically connected to complementary contacts of said delay line means;
   (d) tens transfer means serially connecting said switch means;
   (e) means for supplying an electrical signal which is the equivalent of said sesimic signal to said last of said delay line means;
   (f) means for receiving said electrical signal after passage through said first of said delay line means; and
   (g) means for recording said received signal.

5. Apparatus for applying corrections to a seismic signal comprising
   (a) a source of time-spaced, electrical commands,
   (b) at least two scaling circuits connected in series to the output of said source of commands and operative thereby,
   (c) delay line means equal in number to the number of scaling circuits and each having a plurality of fixed, time-spaced outputs equal in number to the scale of the corresponding scaling circuit and sequentially actuatable in synchronism with the operation of said corresponding scaling circuit,
   (d) a source of an electrical signal which is the equivalent of said seismic signal having its output connected to that end of said delay line means representing the smallest amount of delay, and
   (e) recording means connected to the opposite end of said delay line means.

6. Apparatus in accordance with claim 5 wherein the delay line means is a magnetic delay line having fixed recording and receiving transducers and a ferromagnetic recording surface movable relative to said transducers.

7. Apparatus in accordance with claim 5 wherein the scaling circuit is a decade scaler.

8. Apparatus in accordance with claim 5 wherein the scaling circuit comprises a plurality of serially connected scaling circuits and the source of the electrical signal is connected to that delay line means actuatable by that scaling circuit having the highest scale and the recording means is connected to that delay line means actuatable by the scaling circuit having the lowest scale.

9. Appartus in accordance with claim 5 wherein a visual display means is connected to the scaling circuit and is adapted to display a numerical representation of the instantaneous count of said scaling circuit.

10. Apparatus in accordance with claim 5 wherein the outputs of each of the delay line means are equally spaced one from the other.

11. Apparatus in accordance with claim 8 wherein the scaling circuits are decade scalers.

12. Apparatus in accordance with claim 8 wherein the scaling circuit having the highest scale is a decade scaler and the scaling circuit having the lowest scale is a binary scaler.

References Cited in the file of this patent
UNITED STATES PATENTS

| | | |
|---|---|---|
| 2,406,353 | Myers | Aug. 27, 1946 |
| 2,674,732 | Robbins | Apr. 6, 1954 |
| 2,800,639 | Lee | July 23, 1957 |
| 2,825,886 | Pittman | Mar. 4, 1958 |
| 2,994,851 | Bucy et al. | Aug. 1, 1961 |
| 3,011,583 | Feagin et al. | Dec. 5, 1961 |